Figure 5:
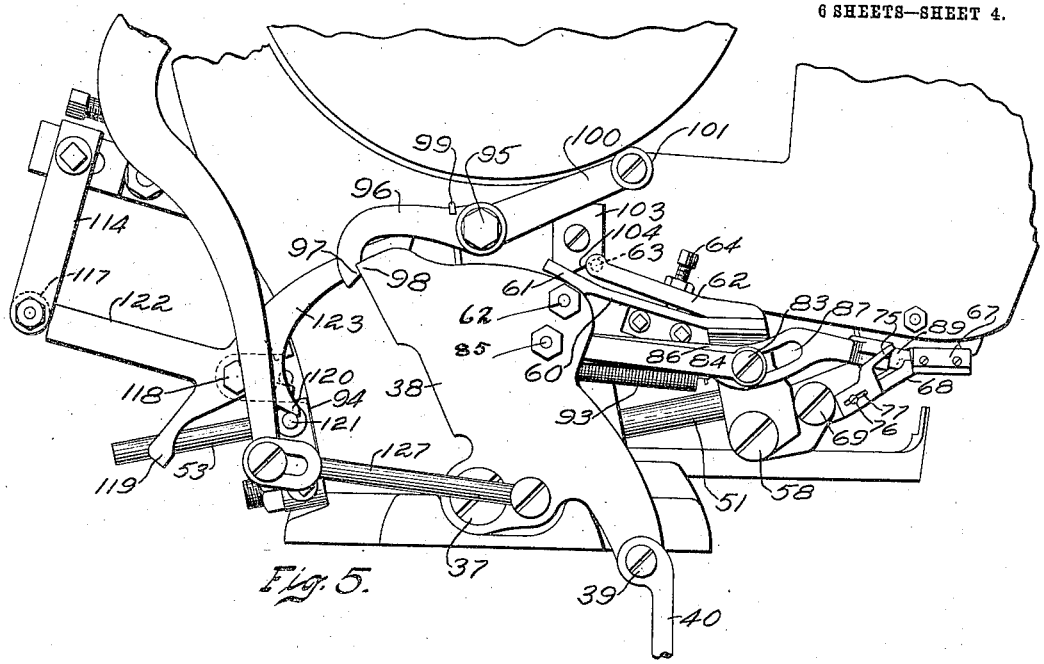

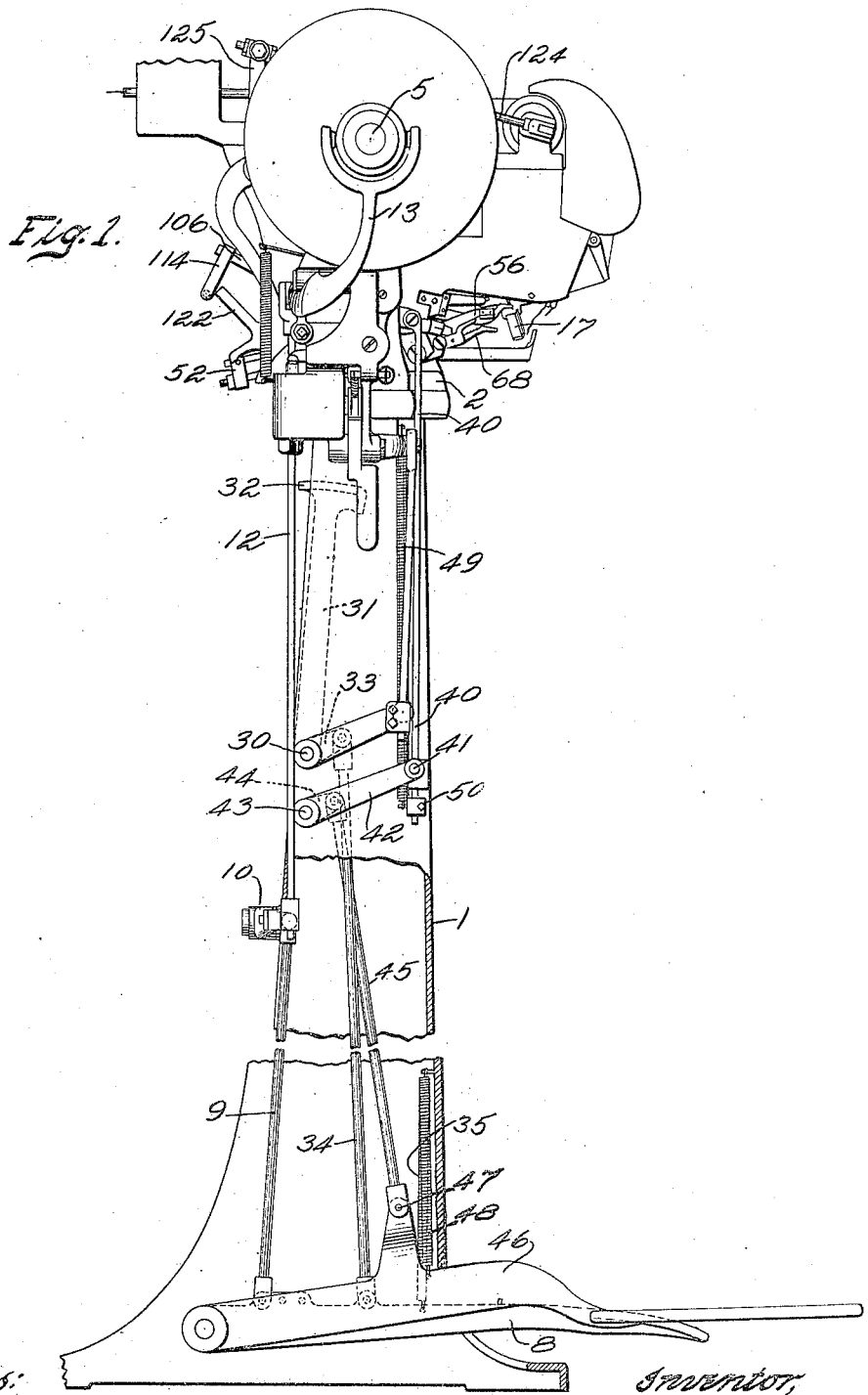

T. G. PLANT.
SEWING MACHINE.
APPLICATION FILED OCT. 19, 1908. RENEWED NOV. 22, 1909.
958,298.
Patented May 17, 1910.
6 SHEETS—SHEET 2.
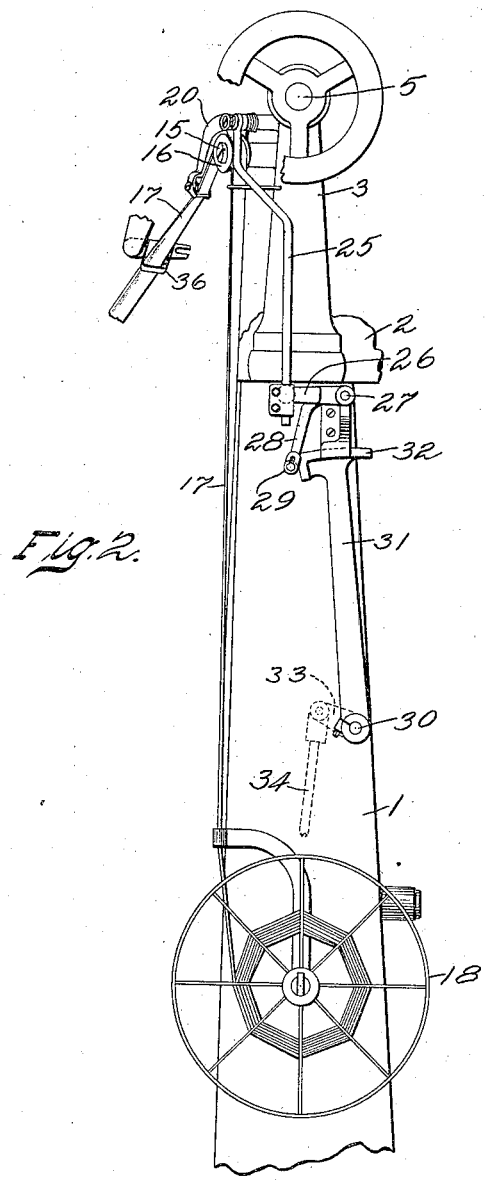
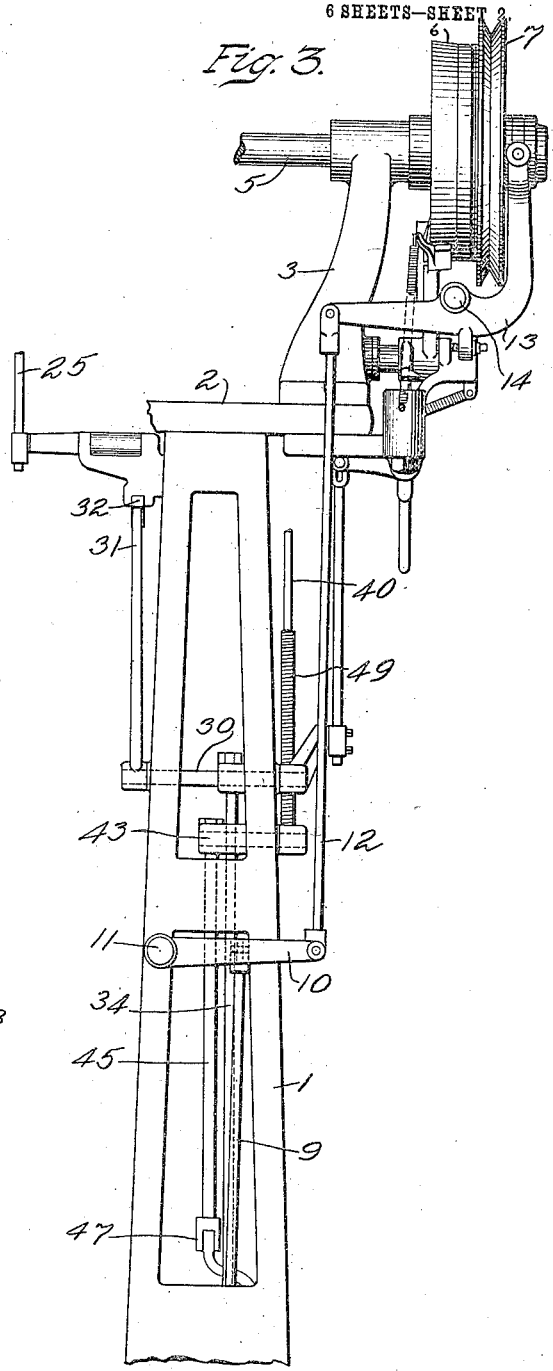

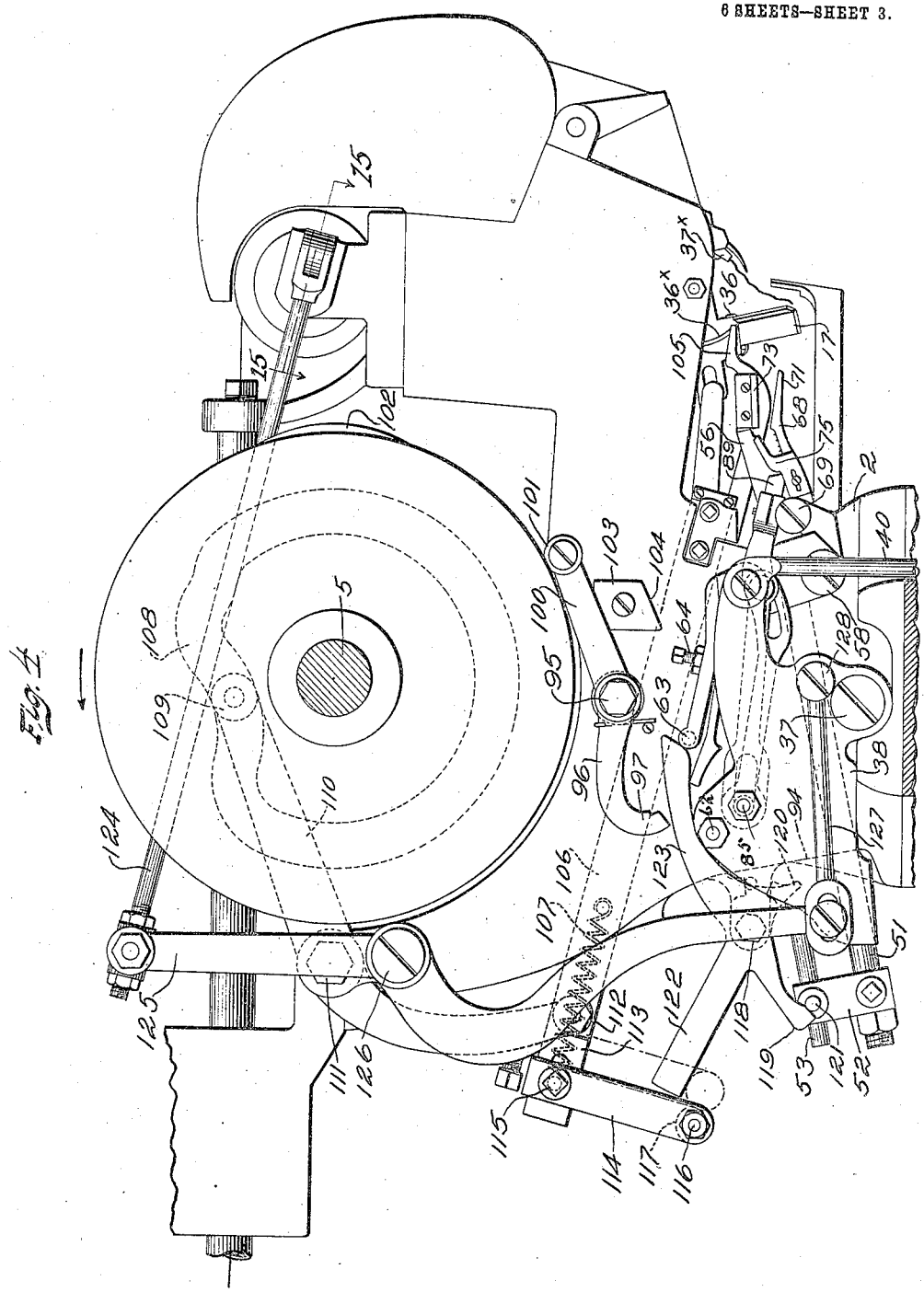

T. G. PLANT.
SEWING MACHINE.
APPLICATION FILED OCT. 19, 1908. RENEWED NOV. 22, 1909.

958,298.

Patented May 17, 1910.

6 SHEETS—SHEET 4.

Witnesses:
Powell F. Hatch
Arthur L. Calvert

Inventor,
Thomas G. Plant,
By Robt. P. Hains.
Attorney.

T. G. PLANT.
SEWING MACHINE.
APPLICATION FILED OCT. 19, 1908. RENEWED NOV. 22, 1909.
958,298.
Patented May 17, 1910.
6 SHEETS—SHEET 5.
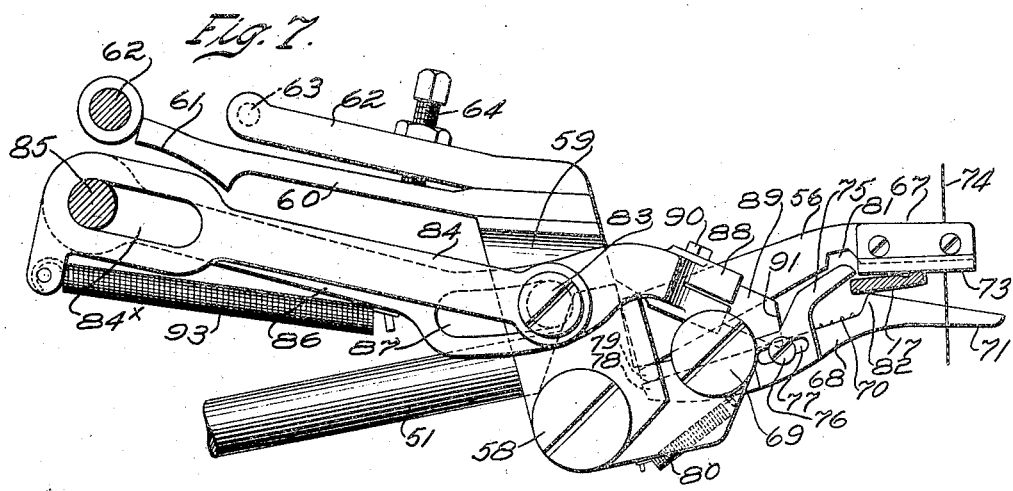
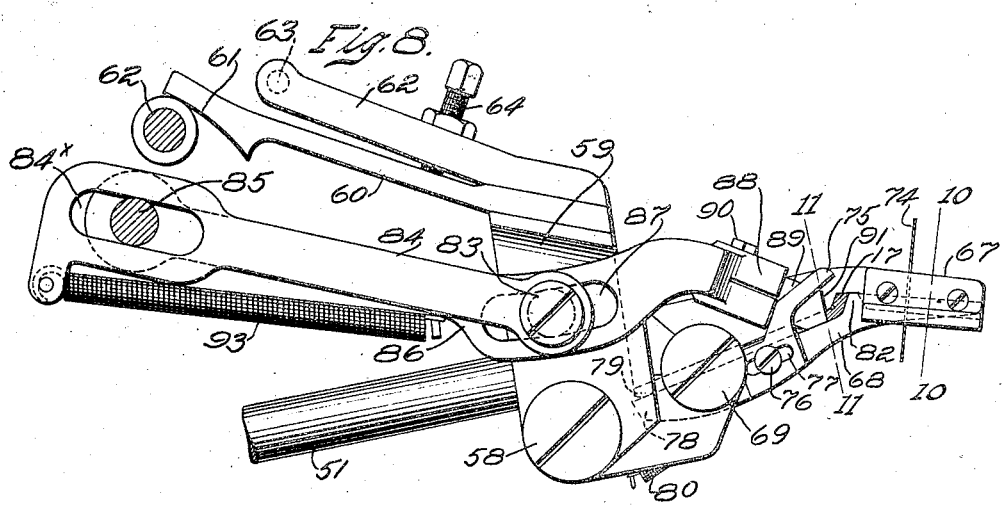
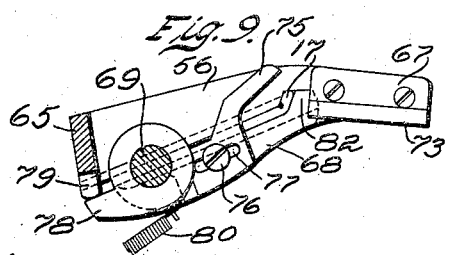
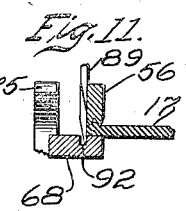
Witnesses:
Rowell F. Hatch.
Arthur W. Calvert.
Inventor,
Thomas G. Plant
By Robt. P. Hains,
Attorney.

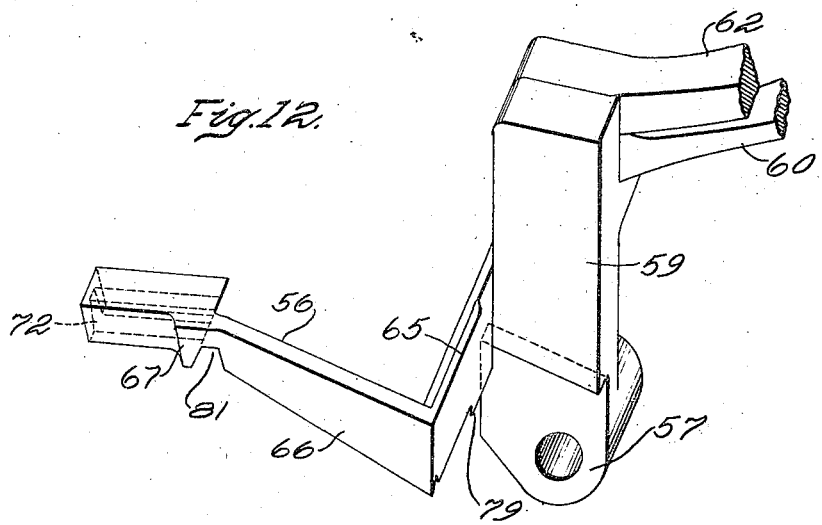
Fig.12.
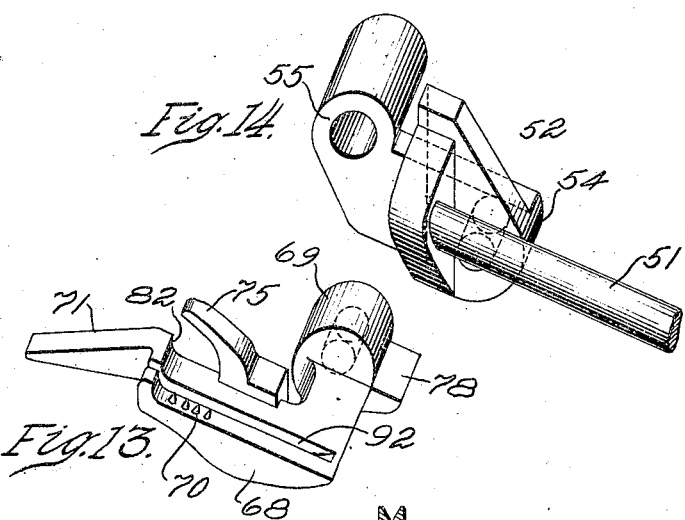
Fig.14.
Fig.13.
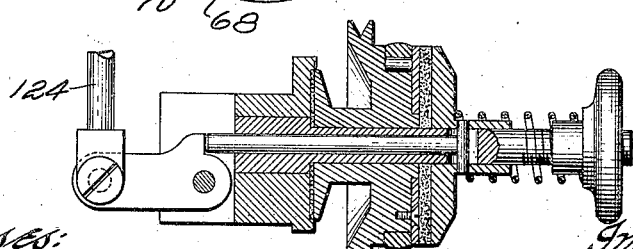
Fig.15.

UNITED STATES PATENT OFFICE.

THOMAS G. PLANT, OF BOSTON, MASSACHUSETTS.

SEWING-MACHINE.

958,298.

Specification of Letters Patent.

Patented May 17, 1910.

Application filed October 19, 1908, Serial No. 458,356. Renewed November 22, 1909. Serial No. 529,306.

*To all whom it may concern:*

Be it known that I, THOMAS G. PLANT, a citizen of the United States, residing at Boston, in the county of Suffolk and State of Massachusetts, have invented an Improvement in Sewing-Machines, of which the following description, in connection with the accompanying drawings, is a specification, like characters on the drawings representing like parts.

The invention to be hereinafter described relates to sewing machines and more particularly to that type of such machines employed in attaching the welt to the insole and upper of a shoe, and generally known as "welters", although it will be understood the invention is not restricted in this respect.

After the sewing operation has been completed in a machine of this general type, it is customary for the operator to draw the shoe away from the stitch forming mechanism in order to cut the welt and thread and thus free the shoe. In thus drawing the shoe away from the stitch forming mechanisms, the welt and thread are likewise drawn from their source of supply, and in cutting these the operative does not find it convenient to cut close to the shoe; in fact, he usually cuts the welt and thread at some distance from the shoe, leaving a waste end projecting from the shoe and a still longer length protruding from the welt guide. This long end extending from the welt guide he draws back toward the source of supply, but still leaves sufficient end protruding or projecting from the welt guide to enable him to seize it and hold it in position against the shoe as the needle makes its advancing or penetrating movement. The part so held by the operative forms another welt end projecting from the shoe which must be trimmed off and thrown away as further waste. The sewing thread also has been the subject of considerable waste, as will be readily understood by those familiar with this type of machine.

In severing the welt and thread to free the shoe at the completion of a sewing operation, economic considerations demand that a minimum amount of welt and thread, consistent with well finished work, be left projecting as waste from the shoe; and in starting the sewing operation that a like minimum amount of welt and thread be wasted. It is also of importance that the welt be properly presented for penetration by the needle on commencing a sewing operation, and with these and other considerations in view the aims and characteristics of the invention will best be made clear by the following description and drawings disclosing one form or embodiment of the invention which in its true scope will be definitely pointed out in the claims.

Figure 6:
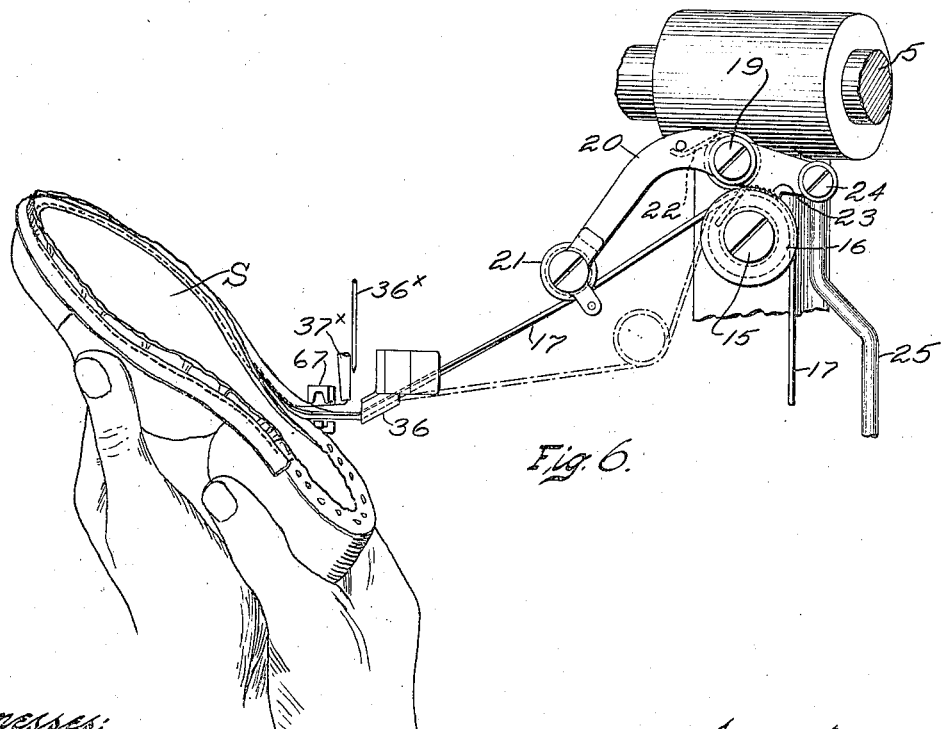

In the drawings: Figure 1 is a side view of a sewing machine showing one form or character of mechanism embodying the present invention, some of the parts being broken away; Fig. 2 is a similar side view looking at the machine from the side opposite that indicated by Fig. 1, part of the standard and many of the unessential details being omitted; Fig. 3 is a view looking at the machine of Fig. 1 from the rear and showing more particularly the starting and stopping means, the welt measurer controller, and treadle connections; Fig. 4 is an enlarged detached side elevation of the machine head, showing the cutting and holding devices, the actuator therefor, and associated parts, the cutting and holding devices being in retracted position; Fig. 5 is an enlarged detail similar to that of Fig. 4 with some of the parts omitted, and showing the cutting and holding devices in advanced position; Fig. 6 is a diagrammatic view, showing the action of the welt measurer in limiting the withdrawal of the welt from its supply at the conclusion of the sewing operation; Fig. 7 is a detached detail of the cutting and holding devices showing their relation as they advance to act upon the welt and thread; Fig. 8 is a view similar to that of Fig. 7 showing the said devices still further advanced; Fig. 9 is a detail of the upper and lower jaws closed; Fig. 10 is a section on line 10, 10, Fig. 8; Fig. 11 is a section on line 11—11, Fig. 8; Figs. 12, 13 and 14 are detached perspective detail views of the upper and lower jaws and the jaw carrying head respectively, showing the parts in separated relation; and Fig. 15 is a detail of a tension device for the thread and the tension releasing means showing a section on line 15—15, Fig. 4.

The machine frame may be of any desired character and is preferably in the form of a column 1 on which is mounted a head 2 having bearing supports 3 for a shaft 5, said shaft constituting the usual driving shaft for the sewing instrumentalities, as will be readily understood by those skilled in the art. The shaft 5 and, consequently, the sewing mechanism, is under the control of a suitable stopping and starting means, which may be of any desired character, and which, in the illustrated machine, is formed by fast and loose clutch members 6 and 7, said members being controlled as to their operative or inoperative relation by means of a treadle 8, Fig. 1. To the starting and stopping treadle 8 is connected the rod 9 which, at its upper end, is joined to an arm 10, Figs. 1 and 3, pivoted to the column 1 at 11, and operatively joined by a rod 12 with one arm of the bell crank lever 13, pivoted to the head at 14, the other arm of said lever being connected to the sliding clutch member, whereby, upon manipulation of the treadle 8, the clutch members may be moved into and out of operative engagement and the driving shaft 5 be driven or not as desired. Means are preferably provided for bringing the machine to a stop with the parts in a predetermined position, as, for instance with the needle out of the work, but as such means forms no essential part of the present invention and may be of the character fully set forth in my application Serial No. 404,795, filed December 2, 1907, a detailed description thereof will be unnecessary.

As hereinbefore stated, when the machine stops at the completion of a sewing operation, the operator withdraws the shoe from the machine and in the absence of any means to prevent, likewise draws with the shoe both the thread and welt and then cuts such thread and welt haphazard and usually with a knife manipulated by his hand. In a prior patent granted to me, No. 877,859, dated January 28, 1908, means were shown, described and broadly claimed for enabling the operator to stop the withdrawal of the welt by placing his foot upon a treadle, thereby locking the welt from further forward movement and furnishing a small amount of slack to permit the operator to withdraw the shoe sufficiently for the desired purposes. In the patented device, however, the locking of the welt was under treadle control quite regardless of whether the machine was in operation or not and while it serves its purposes and is effective in locking the welt from being withdrawn as the shoe is taken from the machine, it yet enables the operator to neglect locking the welt or "measuring" it at the conclusion of the sewing operation. In the present invention, however, the aim is to cause such locking of the welt and its measurement automatic upon the stopping of the machine, so that when the machine comes to rest, and regardless of any special attention on the part of the operator, the welt will be measured and locked, as will more fully appear.

Mounted upon a stud 15 carried by the machine head is a guide 16 which may be formed as a roller, Figs. 2 and 6, over which passes the welt 17, said welt being preferably carried by a reel 18 rotatably mounted on the column 1, Fig. 2. Mounted upon a stud 19 above the roller 16, Figs. 2 and 6, is a measuring arm 20 carrying at its free end, Fig. 6, a roller or guide 21 under which the welt 17 passes, a spring 22 encircling the stud 19 acting normally to raise the free end 21 of the said measuring arm. The said measuring arm 20 at a point substantially above the roller or guide 16 is provided with a series of clamping teeth 23 which, during the normal operation of the machine, are out of contact with the welt 17 passing over the roller 16 but which, when the machine stops, as will presently appear, are brought in contact with said welt, effectually locking it from further advance movement toward the work, as indicated in Fig. 6.

Connected to the measuring arm at 24 is a rod 25, Figs. 2 and 6, said rod extending downward and being connected to an arm 26 pivoted at 27 and carrying a depending portion 28 which may be provided at its free end with a roller or stud 29. Mounted on the shaft 30, Figs. 1, 2 and 3, is a measuring actuator 31 whose upper end consists of an actuating portion 32, preferably cam-shaped and adapted to engage the roller or pin 29 on the depending arm 28, Fig. 2, the construction being such that upon movement of the actuator 31 to the left, Fig. 2, the cam portion 32 will ride under the roller or pin 29, lift the rod 25, and raise the teeth 23 of the measuring arm 20 from contact with the welt 17 passing over the roller 16; but upon movement of said actuator in the opposite direction, said cam portion 32 will ride from under the roller or pin 29 and permit the teeth 23 of the measuring actuator 20 to engage with the welt 17 and lock the same so that no further welt can be withdrawn from the reel 18, a small portion of slack welt being furnished by the upward rise of the end 21 of the measuring device, from the dotted to the full line position, Fig. 6.

Connected to the shaft 30 is an arm 33 which is itself connected to the start and stop treadle 8 by means of the rod 34, Figs. 1, 2 and 3, whereby upon depression of the start and stop treadle 8, as will be readily understood, the arm 33 is turned downward and the measuring actuator 31 is moved to the left, Fig. 2, whereas upon the said start and stop treadle being raised, under the influence of its spring 35, Fig. 1, when the foot of the operator is removed, the movement of the parts will be in the reverse direction and the actuator will move to the right, Fig. 2, as already explained.

As indicated in Figs. 2 and 6, the welt 17 passes from the guide roll 16, under the roll 13

21 on the measuring arm, and then through a welt guide 36, and adjacent said guide it is acted upon by the usual stitch forming mechanism such as the needle 36*, its co-acting looper 37*, and associated parts which, being well understood by those skilled in the art, needs no particular explanation. From Fig. 6 it will be apparent that when the parts are in the position shown, with the welt 17 held by the welt controller, as is the case when the machine is stopped, the shoe S, having the welt attached thereto, can be withdrawn only a predetermined or measured amount from its operative position or from the machine, such predetermined amount being measured by the difference between the straight and deflected welt 17 between the roller 16 and the welt guide 36.

Assuming the machine to have been stopped with the parts as indicated in Fig. 6, the present invention contemplates severing both the welt and thread and holding the ends thereof for the ensuing operations, as will now be explained. Pivotally mounted at 37, Figs. 4 and 5, is a clamp and cutter actuator 38, connected at 39 to the treadle rod 40, said rod extending downward, Fig. 1, and being connected at 41 to an arm 42 secured to a shaft 43 mounted in the machine column. The said shaft 43 has a short arm 44 secured thereto to which is jointed a rod 45 connecting said short arm with the treadle 46 at 47. Said treadle is normally under the action of a spring 48, Fig. 1, whereby it is maintained in the raised position indicated by Fig. 1, a second spring 49, Fig. 1, connected at one end near the head of the machine and at the other end to an adjustable stop 50 on the treadle rod 40 assisting in raising and holding the treadle 46 in the manner hereinbefore described.

Mounted to slide toward and from the front of the machine is a carrier rod 51 having a head 52 to which is connected the cutting and holding mechanism presently to be described. The carrier rod 51 at its rear end, Fig. 4, is provided with a stop 52 suitably clamped thereto and which stop, when the said rod 51 is moved into its forward position, as indicated in Fig. 5, contacts with a fixed part of the machine head to limit the forward movement of said rod. In order to guide the said rod 51 as it moves back and forth in the head, as hereinbefore stated, there is provided a guide rod 53, Figs. 4 and 5, on which slides one end of the stop 52, the other end of the stop being clamped to the carrier rod 51.

The head 52, Fig. 14, mounted on the carrier rod 51 is provided with bearing portions 54, 55 for the pivot pins or supports of the upper and lower clamping jaws, respectively, so that as said head moves toward and from the front of the machine, the said upper and lower jaws will be likewise moved. The upper jaw may be designated as a whole by 56 and, as shown in Fig. 12, comprises a bearing portion 57 for the pivot pin 58, Figs. 7 and 8, which is connected with the head 52, and extending upwardly from said bearing portion 57 is the arm 59 carrying a jaw actuator 60, the end of which, Figs. 7 and 8, is provided with a cam surface 61 to contact with a roll 62 carried by the clamp and cutter actuator 38. Disposed above the arm 60, which may be made of resilient material, is a more rigid arm 62 carrying a roll 63 at its end and having an adjusting screw 64 passing through said arm 62 and bearing upon the resilient arm 60 whereby the position of said arm 60 may be adjusted, as will be readily understood. Extending laterally of the bearing portion 57 of the upper jaw member, Fig. 12, is an arm 65, from which projects forwardly the jaw carrier 66 having at its outer end the upper jaw 67.

The lower jaw which as a whole may be designated as 68, Fig. 13, has a bearing portion 69 whereby it is connected to the bearing portion 55 of the head 52 by means of the pivot 69, Figs. 7 and 8. Extending from the bearing portion 69 is the acting portion of the lower jaw 68, said acting portion being preferably provided with clamping pins 70 to engage the welt and a clamping portion 71 adapted to engage the thread and to be received by the recessed portion 72 of the upper jaw, said parts when in closed position being as indicated in cross-section in Fig. 10. A sharp edge or knife is secured to the side of the upper jaw, Figs. 10 and 11, whereby after the thread 74 is clamped, as indicated, it may be drawn over said knife edge and severed. Preferably mounted upon the lower jaw 68 is a guide 75, said guide being secured to the lower jaw by a screw 76 passing through a slot 77 whereby said guide may be adjusted, as indicated, the function of said guide being, as indicated in Fig. 7, to direct the welt 17 properly into the clamping jaws.

Having reference to Fig. 13, it will be noted that the lower jaw 68 has projecting rearwardly from the bearing portion 69 a projection or lug 78 which, when the upper and lower jaws are assembled upon the head 52, is directly under a toe 79 extending from the arm 65 of the upper jaw member. It will also be seen with reference to Figs. 7 and 8 that the lower jaw is acted upon by a spring 80, one end of which is secured to the lower jaw and the other to a portion of the head 52, whereby said lower jaw is clearly maintained with its outer end in lowered position and the projection or ledge 78 thereof in contact with the toe 79 of the upper jaw, whereby upon closing movement of the upper jaw, the lower jaw will, by the action of the toe 79, be also caused to partake of such closing movement, said jaws thereby acting conjointly to close upon the welt, as indicated in Figs. 7 and 8.

In order that the welt may be properly positioned for penetration by the needle, the upper and lower jaw clamping portions for the welt are formed so that when the welt is held between such portions of the jaws, the edge thereof near where the line of stitches is to be formed is upturned, as indicated in Fig. 8, so that as the needle advances toward the welt at the commencement of the sewing operation, it will strike the same with a direct, penetrating movement, as will be clearly understood by those skilled in the art. To effect this deflection of the welt, various means may be employed; in the present instance, however, the upper jaw is provided with a recess 81, and the lower jaw is provided with a complemental shoulder 82, Figs. 7 and 8, whereby when the welt is grasped by the holding portions of the jaws, its forward edge, which is to be penetrated by the needle is deflected, as indicated in Fig. 8, and at the same time, as hereinbefore described, the thread 74 will be grasped between the recessed portion 72 of the upper jaw and the portion 71 of the lower jaw, the welt and thread being thus securely held ready to be cut and the severed end maintained with little or no waste in proper position for the commencement of the next sewing operation, as will presently appear.

Pivotally connected to the upper jaw member, as at 83, is a link 84 which extends rearward, Figs. 7 and 8, and is provided with a slot or opening 84* in which is engaged a pin 85 carried by the clamp and cutter actuator 38. Pivotally connected to the pin 85 is another link 86 having its forward end slotted as at 87 and embracing the pin 83 which connects the link 84 and the upper jaw. The link 86 extends forward from the pin 83 and is provided near its end with a clamping portion 88 in which is held a knife 89 by means of a clamping screw 90, Figs. 7 and 8, said knife having a shearing, cutting edge 91 and traveling in a slot or opening 92 formed in the lower jaw close to the pins or teeth 70 thereon. The links 84 and 86, Figs. 7 and 8, are connected by a spring 93, the ends of the spring being connected respectively to the slotted ends of each of said links and tending to hold said links with the pins 83 and 85 at more distant portions of the slots 84* and 87, as will be clearly apparent from Figs. 7 and 8.

From the construction described it will be apparent that upon depression of the treadle 40, the clamp and cutter actuator 38 will be turned upon its pivotal support 37 from the position indicated in Fig. 4 to that indicated in Fig. 5. The effect of this turning movement of the actuator 38 is to move the carrier rod and its head 52 in a forward direction, the upper and lower jaws during such movement being maintained in open relation and passing over the welt 17 and thread 74, as indicated in Fig. 7, until said welt and thread are in their proper portions of the clamping jaws, whereupon the stop 52 on the carrier bar 51 contacts with the machine head at 94, thus preventing further forward movement of the head 52 and the upper and lower jaws. Continued movement of the actuator 38 serves then to partially close the jaws and to carry the roll 62 under the cam portion 61 of the arm 60, Figs. 7 and 8, carried by the upper jaw, and cause said jaws to firmly clamp the welt and thread. Such continued forward movement of the actuator 38 then causes the knife 89 carried by the link 86 to move along the slot 92 of the lower jaw and sever the welt held between the jaws, such movement being permitted by the slot and pin and spring connection between the links 84, 86, as hereinbefore described. Completion of treadle movement finishes the welt cutting operations and the actuator 38 turns into the position indicated in Fig. 5, the end of the welt and thread 74 at such times being held between the clamping portions of the upper and lower jaws.

It is desirable that the jaws remain in their forward position so that the welt may be properly positioned for penetration by the needle in the formation of the first stitch in the succeeding sewing operation, and to secure this end without continued pressure upon the treadle 46, there is pivoted upon the machine head at 95 a catch arm 96, the end 97 whereof is adapted to catch over the end portion 98 of the actuator 38, said engagement being automatically secured by means of a spring 99 normally tending to turn the end 97 of the catch 96 in a downward direction, as indicated in Figs. 4 and 5.

The present invention contemplates that the welt and thread holding jaws shall remain in their forward position until after the needle is passed through the work in the formation of the first stitch in the sewing operation, and they may be made to retain their forward position until after the needle has passed through the work, taken the loop of thread, and drawn it through the work, whereupon the invention contemplates that the welt and thread ends shall be released and the jaws be returned to their rear position. To this end the catch 96 is provided with a trip arm 100 having a roller 101 adapted to be acted upon by a trip cam 102 carried by the main shaft 5 of the machine, as indicated in Fig. 4, said trip cam 102 being preferably positioned so that it will not act upon the roller 101 until after the needle has passed through the work, taken a loop of thread and drawn it back through the work, although it is evident that it may be positioned to act sooner or later in the stitch formation if desired.

When the trip cam 102 meets the roll 101, it throws the end 97 of the catch 96 upward, thereby releasing the actuator 38 which under the stress of the springs 48 and 49 immediately turns from the position in Fig. 5 to that in Fig. 4, thus drawing the jaws and cutter to their initial position, as indicated.

To make certain that the jaws open and release the welt and thread when they start on their rearward movement, there is provided on the machine head a stop 103, Figs. 4 and 5, which has a cam surface 104 in the path of the pin or roll 63 carried by the arm 62 secured to the upper jaw, the construction being such that as the jaws move rearwardly, the pin or roll 63 rides upon the inclined cam 104 and at once causes the jaws to release both the welt and thread previously held by them.

As well known by those skilled in the art, the back gage in a machine of this type bears upon the welt close to the point of penetration by the needle and if such back gage is permitted to move forward and strike the welt, at or prior to the time of needle action thereon, it is liable to turn the edge of the welt downward so that the needle will fail to penetrate, and having this matter in mind, the present invention contemplates means for holding the back gage in its rear position until after the needle has penetrated the work, as will now be described.

Mounted in the machine head so as to slide back and forth therein is the back gage 105 carried by the bar 106 and normally pressed in a forward direction by means of a spring 107, said spring acting normally to force the back gage into contact with the work, as indicated in Fig. 4. Mounted on the driving shaft 5 is a cam 108 in which travels a roller 109 carried by an arm 110 pivoted at 111 and having its end 112 adapted to contact with the stop 113 on the bar 106, whereby under the manipulation of the cam 108, the back gage may be withdrawn from its forward position against the tension of the spring 107.

Depending from the slide bar 106 is an arm 114 preferably secured thereto as by a screw bolt 115, said arm 114 having at its lower end a pin 116 extending laterally therefrom and carrying a roller or abutment 117, as indicated in dotted lines in Figs. 4 and 5.

Pivotally mounted on the machine head as at 118 is a back gage controller having the toes 119 and 120 whereby said controller will be turned on its pivot 118 by means of a pin or roller 121 carried by the stop 52. As said stop 52 moves forward, and as the welt and thread holding jaws move into position to grasp and hold the thread and welt, the pin or roller 121 moves from the position indicated in Fig. 4 to the position indicated in Fig. 5 and contacts at such time with the toe 120, thereby turning the controller into the position indicated in Fig. 5. Conversely, when the stop 52 moves to the rear and the welt and thread holding jaws retreat from their forward position, the pin or roller 121 contacts with the arm 119 and moves the controller into the position indicated in Fig. 4. The controller pivoted at 118 has a tailpiece 122 which when the controller is in the position indicated in Fig. 5 and the back gage has been moved to the rear by its cam, is in the path of movement of the roll or projection 117 carried by the arm 114 secured to the slide bar 106 so that at such times, that is, when the jaws are in their forward or welt holding position, the back gage is prevented from forward movement under the stress of the spring 107 by the tailpiece 122. When, however, the holding jaws are moved to the rear, the tailpiece 122 is lifted above the path of movement of the roll or projection 117, thereby freeing the back gage and permitting it to move into operative position.

It is desirable under some conditions that the welt and thread holding jaws be not permitted to move forward into their welt and thread holding position when the back gage is forward, and to this end the back gage controller has an arm 123 which rides on the roll 62 carried by the actuator 38, Fig. 4, the relation of parts being such that when the actuator turns to move the jaws toward the front of the machine, the arm 123 rises. When, however, the back gage is in its forward position, the arm 114 on the slide 106 is moved into the dotted line position, Fig. 4, with the pin 116 and roll 117 directly beneath the tailpiece 122, so that the arm 123 cannot rise, thereby preventing the actuator 38 from moving the jaws into their forward position, as will be readily understood.

Machines of the character herein described are provided with tension means to properly tension and hold taut the sewing thread and such tension means is indicated in Fig. 15, being substantially of the character of my pending application Serial No. 408,015, filed December 26, 1907, and since the specific form of this tension device is immaterial to the present invention and is fully described in said application, it will only be necessary at the present time to state that the members thereof may be controlled to apply or release the tension, all as indicated in the application referred to.

In the present instance, it is desirable that the tension be released at the time the shoe is to be withdrawn from the machine and the cutting and holding devices for the thread and welt are to act upon the thread and welt. To this end, the tension releasing rod 124 is connected to a lever arm 125 pivoted at 126 and having its lower end connected by a rod 127 to the clamp and cutter actuator 38 at 128, so that upon depression of the treadle for actuating the cutting and holding devices for the welt and thread, the tension on the thread will be relieved and offer no obstruction to the free withdrawal of the shoe from its sewing position. When, also, the first stitch has been formed or partially formed with such slack thread, the tension is automatically restored to the thread as the cutting and holding devices for the welt and thread retreat to their initial inactive position.

The characteristics of the present invention will be clear from the foregoing description and the accompanying drawings of one mechanical structure embodying the same, it being understood that the invention is not restricted thereto, and that many alterations may be made in the form and disposition of many of the parts within the true character of the invention which is defined in the claims.

In setting forth the operation of the invention, let it be assumed that the work of sewing a welt to a shoe has reached the finishing point, as indicated in Fig. 6, and that the operative desires to remove the shoe from the machine. The start and stop treadle is released to bring the machine to rest, and, simultaneously therewith, the welt controller clamps and holds the welt, as indicated in Fig. 6, so that no more welt can be drawn from the supply, a limited or measured quantity being furnished to permit the action of the cutting and holding devices, by the upward movement of the measuring arm 21. The operative then puts his foot upon the cutting and holding treadle 46, whereupon the actuator causes the holding jaws to move forward and, simultaneously therewith, the thread tension to be released, so that the operative can move the shoe into position for the action of the holding jaws and cutter. Further depression of the said treadle clamps the jaws upon the welt and thread, whereupon the welt cutter moves through its cutting stroke and severs the welt close to the jaws, the latter serving to retain the end of the severed welt leading from the source of supply. The shoe is now free to be withdrawn from the machine except that the thread is clamped between the jaw portions 67 and 71, and to cut the thread the operative moves the shoe toward himself, thus drawing the thread over the edge of the knife 73 and severing it. Upon movement of the actuator by the treadle, as described, the tailpiece 122 of the back gage controller was also lowered into a position to lock the back gage from forward movement, the catch arm 96 holding the parts in the position described, with the welt and thread holder maintaining the ends of the severed welt and thread in close to the stitch forming mechanism ready for the commencement of the next sewing operation, and the tension of the thread released. At the commencement of another sewing operation, the operative treads the stop and start treadle and the needle advances and finds the edge of the welt, along which the stitches are to be formed, deflected or bent into position to be readily penetrated. The needle passes through the work and proceeds with the formation or part formation of the first stitch while the parts are in position, as described, whereupon the trip cam 102 meets the roll 101, trips the catch arm 96 and permits the actuator to withdraw the cutting and holding devices, free the back gage, and permit the tension devices to resume control of the thread.

An important feature of the present invention, as will be evident, is the limitation placed upon the operative in withdrawing welt from the source of supply, as he moves the shoe for the action of the cutting and holding devices, such limitation being placed upon him by the act of stopping the machine. The importance, also, of holding the end of the severed welt and deflecting the edge thereof to receive the thrust needle as it moves in the formation of the first stitch will be readily appreciated by those skilled in the art, as well, also, as the general character of the welt and thread holding means, the cutters and other features hereinafter definitely pointed out in the claims.

What is claimed is:

1. In a shoe sewing machine for attaching a welt to a shoe, the combination of stopping and starting mechanism for said machine, and welt controlling means actuated upon stopping the machine for preventing the withdrawal of welt upon withdrawal of the work from the machine.

2. In a shoe sewing machine for attaching a welt to a shoe, the combination of starting and stopping means for said machine, and a welt measuring device comprising means acting upon stopping the machine to limit the withdrawal of welt upon withdrawal of the work from the machine.

3. In a shoe sewing machine for attaching a welt to a shoe, the combination of stitch forming mechanism, starting and stopping means therefor, and means acting upon stopping the machine to prevent the welt being drawn from its source of supply.

4. In a shoe sewing machine for attaching a welt to a shoe, the combination of starting and stopping means for said machine, welt controlling means, and connections between said starting and stopping means and welt controlling means to cause the latter to free the welt upon starting the machine and to limit the withdrawal of the welt from its source of supply upon stopping the machine.

5. In a shoe sewing machine for attaching a welt to a shoe, the combination of stopping and starting mechanism for said machine, welt controlling means actuated upon stopping the machine for preventing the withdrawal of welt upon withdrawal of the work from the machine, and means for severing the welt.

6. In a shoe sewing machine for attaching a welt to a shoe, the combination of starting and stopping means for said machine, a welt measuring device comprising means acting upon stopping the machine to limit the withdrawal of welt upon withdrawal of the work from the machine, and means for severing the welt close to the shoe.

7. In a shoe sewing machine for attaching a welt to a shoe, the combination of stopping and starting mechanism for said machine, means acting upon stopping the machine for limiting the withdrawal of welt upon withdrawal of the work from the machine, and welt severing and holding means for severing the welt and holding the severed end.

8. In a shoe sewing machine for attaching a welt to a shoe, stitch forming mechanism and means for operating the same, welt and thread severing and holding means, and a common actuator for said welt and thread holding means to cause the latter to hold the severed ends of said welt and thread.

9. In a shoe sewing machine for attaching a welt to a shoe, stitch forming mechanism and means for operating the same, welt and thread severing and holding means, an actuator for said welt and thread holding means to cause the latter to hold the severed ends of said welt and thread, and means for automatically releasing the severed ends of the welt and thread from the holding means.

10. In a shoe sewing machine, the combination of stitch forming mechanism and operating means therefor, thread clamping means, means for moving the thread clamping means to cause the thread clamping means to engage and hold the thread, and means operative on said movement of the thread clamping means to relieve the thread from tension.

11. In a shoe sewing machine, the combination of stitch forming mechanism and operating means therefor, thread clamping means, means for moving the thread clamping means to cause the thread clamping means to engage and hold the thread, means operative on said movement of the thread clamping means to relieve the thread from tension, and means acting automatically to release the thread from the clamping means and restore the thread tension.

12. In a shoe sewing machine for attaching a welt to a shoe, the combination of welt and thread holding means, actuating devices for causing the said holding means to engage and hold the welt and thread, and welt severing means movable relative to the holding means for severing the held welt.

13. In a shoe sewing machine for attaching a welt to a shoe, the combination of a pair of jaws for engaging and holding the welt, welt severing means, and means to cause relative movement of said jaws and severing means to sever the welt.

14. In a shoe sewing machine, the combination of a pair of jaws having welt and thread engaging portions, welt severing means, and means to cause said jaws to engage and hold the welt and thread and the welt severing means to sever the welt.

15. In a shoe sewing machine for attaching a welt to a shoe, the combination of welt holding means and welt severing means, operating means to cause the severing means to sever the welt and the holding means to hold the severed end of the welt, and a guide for directing the welt to the holding means.

16. In a shoe sewing machine for attaching a welt to a shoe, the combination of welt engaging and holding means comprising a plurality of relatively movable members, a guide movable with said members as they move into operative relation with the welt to engage and direct the welt to the action of said members, and means for relatively moving said members to cause them to engage and hold the welt.

17. In a shoe sewing machine for attaching a welt to a shoe, the combination of welt engaging and holding means comprising a plurality of relatively movable members, a guide to engage and direct the welt to the action of said members as they are moved into operative relation with the welt, means for relatively moving said members to cause them to engage and hold the welt, and means permitting adjustment of said guide with respect to said members.

18. In a shoe sewing machine for attaching a welt to a shoe, the combination of stitch forming mechanism, welt severing mechanism and welt engaging and holding means for the end portion of a severed welt, and an actuator for causing said means to engage and hold the welt, said welt engaging and holding means being provided with a portion to deflect the edge of the welt for the action of the stitch forming mechanism.

19. In a shoe sewing machine, the combination of stitch forming mechanism, welt severing means, welt holding means for holding the end of the severed welt, and means for positioning the edge of the welt for the action of the stitch forming mechanism.

20. In a shoe sewing machine, the combination of stitch forming mechanism, welt severing means, actuating devices therefor, and means for bending and clamping the edge of the severed welt in position for the action of the stitch forming mechanism.

21. In a shoe sewing machine, the combination of stitch forming mechanism, welt severing means, a pair of jaws separate from the severing means for engaging and holding the end of the severed welt, means for advancing the said jaws and moving them each toward the other to engage and hold the welt, and means for opening said jaws to free the welt after the action of the stitch forming mechanism has commenced.

22. In a shoe sewing machine, the combination of stitch forming mechanism, welt severing means, a pair of jaws having portions for holding the thread and the end of the severed welt, means for advancing said jaws and moving them each toward the other, and means for opening the jaws to free the thread and welt after the action of the stitch forming mechanism has commenced.

23. In a shoe sewing machine, the combination of welt severing means, an actuator for moving said severing means forward to cut the welt, a back gage, and means for locking the back gage in rear position while the welt severing means is in forward position.

24. In a shoe sewing machine, the combination of stitch forming mechanism, welt severing and holding means, an actuator for moving said welt severing and holding means into position for cutting and holding the welt, a back gage, and means for holding the back gage away from the work while the welt severing and holding means is in severing and holding position.

25. In a shoe sewing machine, the combination of stitch forming mechanism, welt holding means for holding the end of the welt in position for the action of the stitch forming mechanism at the commencement of the sewing operation, a back gage, and means for holding the back gage from contact with the work until after the action of the stitch forming mechanism has commenced.

26. In a shoe sewing machine, the combination of stitch forming mechanism, welt holding means for holding the end of the welt in position for the action of the stitch forming mechanism at the commencement of the sewing operation, means for moving said welt holding means away from welt holding position, a back gage, and means for holding the back gage out of contact with the work while the welt holding means is in welt holding position.

27. In a shoe sewing machine for attaching a welt to a shoe, the combination of a jaw carrying head, a pair of jaws carried by said head, said jaws having a welt engaging portion, a welt cutter movable relative to said jaws, means to advance the head carrying the jaws into operative relation with the welt and then close said jaws upon the welt and operate the welt cutter to sever the welt.

28. In a shoe sewing machine of the character described, the combination of a jaw carrying head, a pair of jaws carried by said head, said jaws having welt and thread engaging portions, means to cause the jaws to engage and hold the welt and thread, means to sever the welt, and means to sever the thread.

29. In a shoe sewing machine for attaching a welt to a shoe, stitch forming mechanism, welt cutting mechanism and actuating means therefor and welt end holding means for clamping and holding the end of the severed welt for the action of the stitch forming mechanism, said welt end holding means having provisions for deflecting or bending the longitudinal edge of the held welt in a transverse direction.

30. In a shoe sewing machine for attaching a welt to a shoe, stitch forming mechanism, welt holding jaws, means for clamping the welt between said jaws for the action of the stitch forming mechanism, and a separate knife movable across the holding portions of said jaws to sever the welt.

31. In a shoe sewing machine for attaching a welt to a shoe, the combination of stitch forming mechanism, welt holding members having coöperating portions for deflecting the edge of the welt, and means for relatively moving said members to cause them to clamp and hold the welt end between them with its deflected portion positioned for the stitch forming mechanism.

32. In a shoe sewing machine for attaching a welt to a shoe, welt end holding means, actuating means for moving the holding means toward and from the welt, a back gage, means to move it toward and from the work, and means to prevent the welt holding means from moving toward the welt when the back gage is in its forward position.

33. In a shoe sewing machine for attaching a welt to a shoe, the combination of stitch forming mechanism, welt holding members having coöperating portions for deflecting or bending the edge of the welt, means for relatively moving said members to cause them to clamp and hold the welt, and means for severing the welt.

In testimony whereof, I have signed my name to this specification, in the presence of two subscribing witnesses.

THOMAS G. PLANT.

Witnesses:
MARION F. KIMBALL,
ARTHUR W. CALVER.